United States Patent [19]

Hasegawa et al.

[11] Patent Number: 5,609,975

[45] Date of Patent: Mar. 11, 1997

[54] POSITIVE ELECTRODE FOR NON-AQUEOUS ELECTROLYTE LITHIUM SECONDARY BATTERY AND METHOD OF MANUFACTURING THE SAME

[75] Inventors: Masaki Hasegawa, Hirakata; Yasuhiko Bito, Osaka Prefecture; Shuji Ito, Akashi; Toshihide Murata, Izumiotsu; Yoshinori Toyoguchi, Yao, all of Japan

[73] Assignee: Matsushita Electric Industrial Co., Ltd., Osaka, Japan

[21] Appl. No.: 439,218

[22] Filed: May 11, 1995

[30] Foreign Application Priority Data

May 13, 1994 [JP] Japan ................ 6-099989

[51] Int. Cl.$^6$ ................ H07M 4/62
[52] U.S. Cl. ................ 429/217; 427/126.3; 429/218
[58] Field of Search ................ 429/217, 218; 427/126.3, 388.5

[56] References Cited

U.S. PATENT DOCUMENTS

| | | | |
|---|---|---|---|
| 4,710,335 | 12/1987 | Kita et al. | 429/217 X |
| 4,940,605 | 7/1990 | Damper | 427/388.5 X |
| 4,964,877 | 10/1990 | Keister et al. | 29/623.1 |
| 5,286,582 | 2/1994 | Tahara | 429/218 |
| 5,316,875 | 5/1994 | Murai et al. | 429/194 |
| 5,409,786 | 4/1995 | Bailey | 429/217 X |
| 5,443,601 | 8/1995 | Doeff et al. | 429/217 X |

FOREIGN PATENT DOCUMENTS

| | | | |
|---|---|---|---|
| 55-69960 | 5/1980 | Japan | 429/217 |
| 1-304664 | 12/1989 | Japan . | |
| 3-108264 | 5/1991 | Japan . | |
| 5-6779 | 1/1993 | Japan . | |

Primary Examiner—Stephen N. Kalafut
Attorney, Agent, or Firm—Panitch Schwarze Jacobs & Nadel, P.C.

[57] ABSTRACT

A positive electrode for a non-aqueous electrolyte lithium secondary battery comprises an active material represented by the formula $Li_xA_{1-y}M_yO_2$ (wherein A represents at least one transition element selected from the group consisting of Mn, Co, and Ni, M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$), a binder, a conductive agent and a current collector. The binder is selected from the group consisting of a copolymer comprising a tetrafluoroethylene unit and a hexafluoropropylene unit, a copolymer comprising a vinylidene fluoride unit, a copolymer comprising a propylene unit and a tetrafluoroethylene unit, and a polymer comprising a trifluoropropylmethylsiloxane unit.

13 Claims, 1 Drawing Sheet

POSITIVE ELECTRODE FOR NON-AQUEOUS ELECTROLYTE LITHIUM SECONDARY BATTERY AND METHOD OF MANUFACTURING THE SAME

BACKGROUND OF THE INVENTION

1. Field of the Invention

The present invention relates to a positive electrode for non-aqueous electrolyte lithium secondary batteries and a method of manufacturing the same.

2. Description of the Prior Art

Non-aqueous electrolyte secondary batteries having a lithium or lithium compound negative electrode have been studied extensively for their potentials for high voltage and high energy density.

Positive electrode-active materials of non-aqueous electrolyte secondary batteries proposed hitherto include oxides of transition metals and chalcogen compounds, such as $Li_xCoO_2$, $Li_xMn_2O_4$, $Li_xFeO_2$, $Li_xNiO_2$, $V_2O_5$, $Cr_2O_5$, $MnO_2$, $TiS_2$, $MoS_2$, and the like.

These active materials have layers or tunnel-like crystal structures allowing intercalation and deintercalation of lithium ions. Especially $Li_xCoO_2$ (hereinafter referred to as $LiCoO_2$), $Li_xNiO_2$ (hereinafter referred to as $LiNiO_2$), $Li_xMnO_2$ (hereinafter referred to as $LiMnO_2$), and $Li_xMn_2O_4$ (hereinafter referred to as $LiMn_2O_4$) are noted as 4V-class positive electrode active materials for non-aqueous electrolyte lithium secondary batteries. $LiCoO_2$ is a most promising positive electrode active material because of its favorable properties.

While cobalt contained in $LiCoO_2$ is relatively expensive, $LiNiO_2$, which is cheaper and thus allows stable supply, has been noted recently. $LiNiO_2$ has a similar composition and structure to those of $LiCoO_2$ and is expected to give a high capacity and a high voltage as a positive electrode active material for lithium secondary batteries. Improved synthesis has increased the capacity of $LiNiO_2$ to the level exceeding $LiCoO_2$. $LiMn_2O_4$ has also excellent properties with a slightly lower capacity, and $LiMnO_2$ has also been studied extensively for practical applications.

Binders generally applied for preparation of positive electrodes with these active materials are required to be chemically inactive and stable against organic electrolyte. Polytetrafluoroethylene having a structural formula represented by the formula (1), which is a chemically inactive and stable resin, is widely used as the binder.

$$(-CF_2-CF_2-)_n \quad (1)$$

A typical method applied to preparation of electrodes includes the steps of mixing an aqueous dispersion of a resin powder with an active material, a conductive agent and other additives to prepare a paste, and applying the paste onto current collectors or electrically-conductive electrode supports to form electrodes. Another method comprises mixing of a powdery binder with an active material, a conductive agent and other additives in dry stage and pressure-molds the mixture.

When these complex oxides containing lithium and a transition metal are used as a positive electrode active material for preparation of positive electrodes of lithium secondary batteries, properties of the electrodes thus obtained are significantly affected by various conditions including the type of a binder applied and the type of a dispersion medium in which a mixture of an active material, a binder, a conductive agent and other additives are dispersed.

Electrodes containing $LiNiO_2$ as an active material have varying properties according to the types of a binder and a dispersion medium. This is partly ascribed to the high reactivity of $LiNiO_2$ with water. $LiNiO_2$ easily causes an ion exchange reaction between protons and lithium ions in the presence of water, thus lowering the capacity. The former method using water as a dispersion medium undesirably lowers the capacity.

Preparation of electrodes in dry state, on the other hand, causes insufficient dispersion of constituents, thereby lowering the capacity.

SUMMARY OF THE INVENTION

In view of the above, it is an object of the present invention to provide a positive electrode for lithium secondary batteries having excellent properties.

The present invention provides a positive electrode for a non-aqueous electrolyte lithium secondary battery, which comprises a positive electrode active material represented by the general formula $Li_xA_{1-y}M_yO_2$ (wherein A represents at least one transition element selected from the group consisting of Mn, Co, and Ni, M represents at least one element selected from the group consisting of B, Mg, Ca, St, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$), a binder, a conductive agent and a current collector. The binder is at least one member selected from the group consisting of a copolymer comprising a tetrafluoroethylene unit and a hexafluoropropylene unit, a copolymer comprising a vinylidene fluoride unit, a copolymer comprising a propylene unit and a tetrafluoroethylene unit, and a polymer comprising a trifluoropropylmethylsiloxane unit.

The copolymer comprising a vinylidene fluoride unit is preferably selected from the group consisting of a copolymer comprising a vinylidene fluoride unit and a hexafluoropropylene unit; a copolymer comprising a vinylidene fluoride unit and a pentafluoropropylene unit; a copolymer comprising a vinylidene fluoride unit and a chlorotrifluoroethylene unit; a copolymer comprising a vinylidene fluoride unit, a hexafluoropropylene unit and a tetrafluoroethylene unit; a copolymer comprising a vinylidene fluoride unit, a pentafluoropropylene unit and a tetrafluoroethylene unit; and a copolymer comprising a vinylidene fluoride unit, a perfluoromethyl vinyl ether unit and a tetrafluoroethylene unit.

It is preferable that the copolymer comprising a vinylidene fluoride unit is an elastomer (fluorocarbon rubber) and cross-linked in a resultant electrode.

The present invention is also directed to a method of manufacturing a positive electrode for a non-aqueous electrolyte lithium secondary battery. The method comprises the steps of:

mixing a positive electrode active material represented by the general formula $Li_xA_{1-y}M_yO_2$ (wherein A represents at least one transition element selected from the group consisting of Mn, Co, and Ni, M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$), a binder, a conductive agent and an organic solvent to prepare a paste; and applying the paste onto a current collector and drying the current collector. The binder is selected from the group consisting of a copolymer comprising a tetrafluoroethylene unit and a hexafluoropropylene unit, a copolymer comprising a vinylidene fluoride unit, a copolymer comprising a propylene unit and a tetrafluoroethylene unit, and a polymer comprising a trifluoropropylmethylsiloxane unit.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
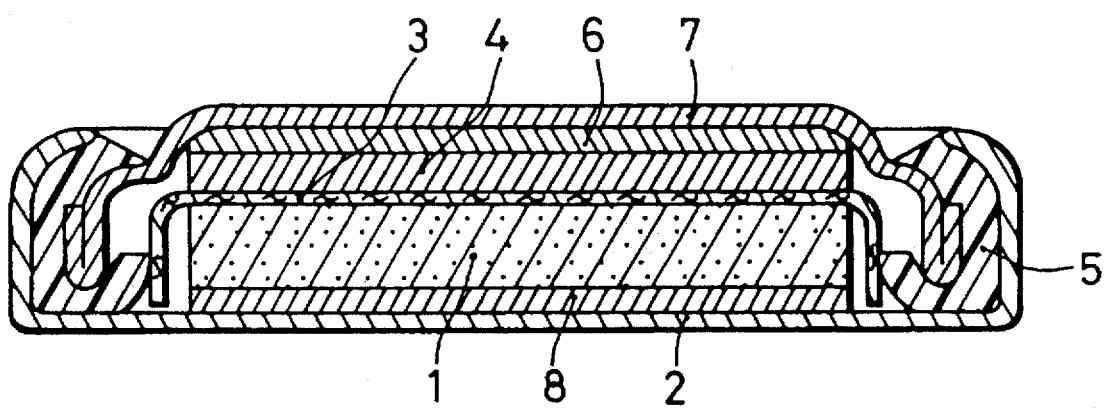
FIG. 1 is a longitudinal cross sectional view illustrating a secondary battery in an embodiment of the present invention.

Completion of the present invention is based on examination of various binders and dispersion media or solvents applied to preparation of an electrode with a positive electrode active material, especially $LiNiO_2$. Since water contained in an aqueous dispersion of polytetrafluoroethylene deteriorates properties of the active material as described previously, a dispersion in an organic solvent has been examined.

Of the polytetrafluoroethylenes, however, highly polymerized ones having a sufficient binding ability and therefore serving as a binder are difficult to disperse in an organic solvent. An electrode was therefore prepared in a non-aqueous system using as a binder polyvinylidene fluoride, which is a fluorocarbon resin soluble in some organic solvents and has a structural formula represented by the formula (2). A paste-like mixture was prepared by mixing polyvinylidene fluoride dissolved in an organic solvent with an active material and a conductive agent and applied onto a current collector to prepare an electrode plate.

(2)

This gave a positive electrode having a higher capacity than that of $LiCoO_2$. A non-aqueous electrolyte lithium secondary battery was then prepared using the $LiNiO_2$-containing positive electrode thus obtained. The charge and discharge properties test showed that the secondary battery had an excellent initial capacity but relatively poor storage properties. From the analysis of the secondary battery based on the charge and discharge properties test and the evaluation of reactivity of the electrode constituents, such poor storage properties are partly ascribed to the binder, polyvinylidene fluoride, which is swollen by and is dissolved in an organic electrolyte while reacting with the electrolyte salt.

Fluorocarbon resins and elastomers (fluorocarbon rubbers) given below have been selected for a binder, which is less active to the organic electrolyte than vinylidene fluoride polymer and allows preparation of electrodes in a non-aqueous system. These binders enable preparation of high-performance positive electrodes of lithium secondary batteries.

Applicable fluorocarbon resins and elastomers include tetrafluoroethylene-hexafluoropropylene copolymers represented by the formula (3), vinylidene fluoride-hexafluoropropylene copolymers represented by the formula (4), vinylidene fluoride-pentafluoropropylene copolymers represented by the formula (5), vinylidene fluoride-chlorotrifluoroethylene copolymers represented by the formula (6), vinylidene fluoride-hexafluoropropylene-tetrafluoroethylene copolymers represented by the formula (7), vinylidene fluoride-pentafluoropropylene-tetrafluoroethylene copolymers represented by the formula (8), vinylidene fluoride-perfluoromethyl vinyl ether-tetrafluoroethylene copolymers represented by the formula (9), tetrafluoroethylene-propylene copolymers represented by the formula (10), and trifluoropropylmethylsiloxane polymers represented by the formula (11).

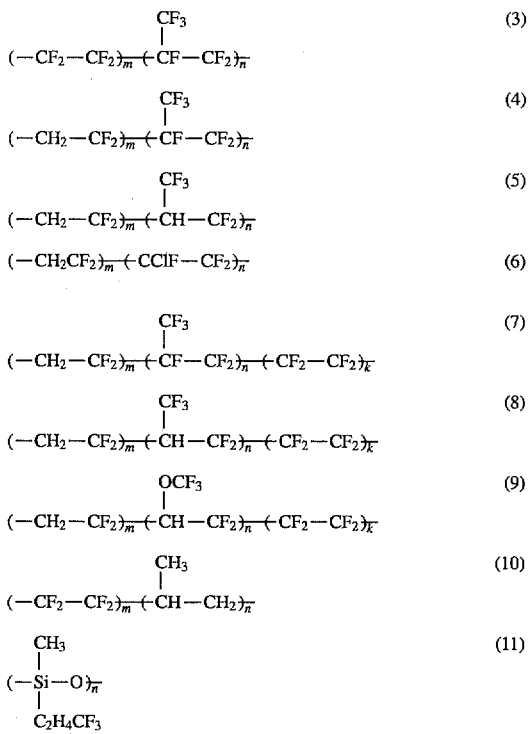

The above-mentioned copolymers may have any arrangement of monomer units, but preferably have compositions given below. The tetrafluoroethylene-hexafluoropropylene copolymer contains from 30 to 60 mol % of the tetrafluoroethylene unit, while the vinylidene fluoride-hexafluoropropylene copolymer and vinylidene fluoride-pentafluoropropylene copolymer contain from 50 to 85 mol % of the vinylidene fluoride unit. The vinylidene fluoride-chlorotrifluoroethylene copolymer contains from 50 to 75 mol % of the vinylidene fluoride unit, while the vinylidene fluoride-hexafluoropropylene-tetrafluoroethylene copolymer and vinylidene fluoride-pentafluoropropylene-tetrafluoroethylene copolymer contain from 20 to 50 mol % of the vinylidene fluoride unit and not greater than 30 mol % of the tetrafluoroethylene unit. The vinylidene fluoride-perfluoromethyl vinyl ether-tetrafluoroethylene copolymer contains from 10 to 50 mol % of the vinylidene fluoride unit and not greater than 35 mol % of the tetrafluoroethylene unit, while the tetrafluoroethylene-propylene copolymer contains from 30 to 60 mol % of the tetrafluoroethylene unit.

The tetrafluoroethylene-hexafluoropropylene copolymer is effectively dispersed in an organic solvent and allows preparation of electrodes in a non-aqueous system. The tetrafluoroethylene-hexafluoropropylene copolymer is chemically stable as polytetrafluoroethylene and has excellent properties sufficient for a binder applied to positive electrodes of lithium secondary batteries.

The fluorocarbon elastomers (fluorocarbon rubbers) are soluble in some organic solvents and allow preparation of electrodes in a non-aqueous system. Cross-linking reactions of the elastomers enhance the properties including solvent resistance and heat resistance and give electrodes having sufficient chemical stability. These elastomers also improve the cycle performance, which constitute a drawback of $LiNiO_2$ used as the positive electrode active material. The fluorocarbon elastomers (fluorocarbon rubbers) applied as a binder have sufficient elasticity to effectively prevent destruction of active material particles and electrodes due to a variation in volume of an active material in the charge and discharge process, thereby improving the cycle performance.

The present invention is also preferably applicable to electrodes containing a compound, such as $LiCoO_2$ and $LiMn_2O_4$, as an active material. In preparation of electrodes containing such a compound as an active material, an aqueous dispersion of polytetrafluoroethylene is conventionally used for preparation of a paste-like mixture of active material. Remaining lithium salts in the active material in the course of synthesis thereof increase the pH level of the paste, which may corrode the current collector or cause other troubles in preparation of electrodes.

A possible countermeasure taken improves the conditions of synthesis of an active material to prevent contamination by nonreacted lithium salts, while another countermeasure washes an active material powder with water prior to preparation of electrodes to remove remaining lithium salts. These countermeasures, which are generally time- and labor-consuming, are, however, significantly affected by varied qualities of starting materials for synthesis of an active material and may not yield electrodes having excellent properties and stability.

The present invention is applicable to $LiCoO_2$ and $LiMn_2O_4$ used as a positive electrode active material to yield stable and high-performance electrodes without being affected by the varying conditions of synthesis of an active material. The present invention does not cause any troubles including corrosion of the current collector at the raised pH due to dissolution of remaining lithium salts. The fluorocarbon elastomers (fluorocarbon rubbers) further improve the cycle performance of these compounds, like $LiNiO_2$ described above.

As described above, the following polymers are applicable as a binder to give a positive electrode of lithium secondary batteries with excellent properties: tetrafluoroethylene-hexafluoropropylene copolymers, vinylidene fluoride-hexafluoropropylene copolymers, vinylidene fluoride-pentafluoropropylene copolymers, vinylidene fluoride-chlorotrifluoroethylene copolymers, vinylidene fluoride-hexafluoropropylene-tetrafluoroethylene copolymers, vinylidene fluoride-pentafluoropropylene-tetrafluoroethylene copolymers, vinylidene fluoride-perfluoromethyl vinyl ether-tetrafluoroethylene copolymers, tetrafluoroethylenepropylene copolymers, and trifluoropropylmethylsiloxane polymers.

The following Examples are presented as specific illustrations of the invention. It should be understood, however, that the invention is not limited to the specific details set forth in the Examples.

EXAMPLE 1

In this example, a positive electrode was prepared by utilizing $LiNiO_2$ as an active material and a dispersion of tetrafluoroethylene-hexafluoropropylene copolymer in an organic solvent as a binder.

A dispersion was prepared by dispersing tetrafluoroethylene-hexafluoropropylene copolymer powder in a mixture of xylene and cyclohexane. $LiNiO_2$ powder and acetylene black as a conductive agent were mixed in a weight ratio of 100:3, and the resultant mixture was added with the dispersion to give a mixture of $LiNiO_2$ powder, the conductive agent, and the binder (solid content) in a weight ratio of 100:3:4. The mixture was sufficiently kneaded to prepare a paste. The paste-like mixture was applied onto a current collector of aluminum foil, which was sufficiently dried and heated at 350° C. for one hour. The current collector with the paste-like mixture applied thereon was pressed at a pressure of 2 ton/cm², and was cut into a 10 mm square piece as a positive electrode plate. The weight of the electrode mixture on the positive electrode plate was 20 mg.

FIG. 1 is a longitudinal cross sectional view illustrating a secondary battery having the positive electrode plate thus prepared. A positive electrode 1 having a current collector 8 was arranged on the center of a casing 2. A porous polypropylene film used as a separator 3 was disposed on the positive electrode 1. A negative electrode 4 was a carbon electrode prepared by applying a paste-like mixture of carbon powder and styrene-butadiene rubber (SBR) latex in a weight ratio (solid content) of 100:2 onto a current collector 6 of copper foil. A non-aqueous electrolyte was prepared by dissolving 1 mol/l lithium hexafluorophosphate in a mixture of ethylene carbonate and diethyl carbonate (1:1 by volume).

The electrolyte was poured onto the separator 3 in the casing 2 and onto the negative electrode 4 incorporated in a sealing plate 7. The sealing plate 7 with a gasket 5 and the casing 2 were then assembled to give a sealed battery. Since the negative electrode had a capacity sufficiently greater than that of the positive electrode, a capacity of the battery was restricted by the capacity of the positive electrode. This battery is hereinafter referred to as battery A.

A non-aqueous paste-like mixture containing polyvinylidene fluoride as a binder and N,N-dimethylformamide as a solvent for dissolving the binder was also prepared as a reference. A positive electrode was manufactured in a similar manner to the above, and a battery assembled with the positive electrode is hereinafter referred to as battery B. Another reference positive electrode was manufactured in a similar manner to the above using an aqueous dispersion of polytetrafluoroethylene as a binder, and a battery assembled with the positive electrode is hereinafter referred to as battery C.

High-temperature storage properties were evaluated for the respective ten batteries A, B and C.

The charge and discharge was carried out at a constant current of 0.5 mA in a voltage range of 3.0–4.2 V. The condition of high-temperature storage was at 60° C. for 20 days under the charged condition of the second cycle. Table 1 shows mean values of capacities immediately before the storage, voltages and capacity maintenance rates immediately after the storage, and capacity maintenance rates at the second cycle after the storage.

TABLE 1

|  | Capacity immediately before storage (mAh) | Voltage immediately after storage (V) | Capacity maintenance rate immediately after storage (%) | Capacity maintenance rate at 2nd cycle after storage (%) |
|---|---|---|---|---|
| Battery A | 3.92 | 3.9 | 53 | 92 |
| Battery B | 3.90 | 0.1 | 0 | 41 |
| Battery C | 2.87 | 3.4 | 27 | 79 |

As clearly shown in Table 1, the capacities immediately before the storage were substantially equal for the battery A (3.92 mAh) and the battery B (3.90 mAh), while the battery C had a significantly lower capacity of 2.87 mAh. The voltage immediately after the storage lowered to 0.1 V for the battery B, and the capacity maintenance rate at the second cycle after the storage dropped to 41%. The battery A, on the other hand, had 3.9 V for the voltage immediately after the storage, 53% for the capacity maintenance rate immediately after the storage, and 92% for the capacity maintenance rate at the second cycle after the storage. This clearly shows improvement in the high-temperature storage properties. The battery C using the binder with high chemical stability showed no abrupt drop in the capacity maintenance rate but held 79% at the second cycle after the storage. This level is, however, relatively lower than that of the battery A, while the absolute capacity of the battery C is significantly smaller than that of the battery A.

EXAMPLE 2

In this example, a positive electrode was prepared by utilizing $LiNiO_2$ as an active material and various fluorocarbon elastomers as a binder.

Various elastomers of vinylidene fluoride-containing copolymers were used as a binder. $LiNiO_2$ powder and acetylene black as a conductive agent were mixed in a weight ratio of 100:3, and added with a solution prepared by dissolving each copolymer in methyl isobutyl ketone to give a mixture of $LiNiO_2$ powder, the conductive agent, and the binder (solid content) at a weight ratio of 100:3:4. The mixture was sufficiently kneaded and was added with a cross-linking agent to yield a paste. The paste-like mixture was applied onto a current collector of aluminum foil, which was heated at 150° C. and dried sufficiently. The current collector with the paste-like mixture applied thereon was pressed at a pressure of 2 ton/cm$^2$, and was cut into a 10 mm square piece as a positive electrode plate. The weight of the electrode mixture on the positive electrode plate was 20 mg.

Tetrahydrofuran was used as a solvent for the binder of an elastomer of tetrafluoroethylene-propylene copolymer, whereas methyl isobutyl ketone was used for the binder of an elastomer of trifluoropropylmethylsiloxane polymer. Positive electrodes were manufactured in a similar manner to the above, using various binders and solvents.

Batteries were assembled with the positive electrodes thus obtained in the same manner as in Example 1. Battery D2 has vinylidene fluoride-hexafluoropropylene copolymer as a binder of the positive electrode, battery E2 has vinylidene fluoride-pentafluoropropylene copolymer, battery F2 has vinylidene fluoride-chlorotrifluoroethylene copolymer, battery G2 has vinylidene fluoride-hexafluoropropylene-tetrafluoroethylene copolymer, battery H2 has vinylidene fluoride-pentafluoropropylenetetrafluoroethylene copolymer, battery I2 has vinylidene fluoride-perfluoromethyl vinyl ether-tetrafluoroethylene copolymer, battery J2 has tetrafluoroethylene-propylene copolymer, and battery K2 has trifluoropropylmethylsiloxane polymer.

The batteries B and C prepared in Example 1 were used as references for Example 2.

High-temperature storage properties were evaluated for ten batteries each.

The charge and discharge was carried out at a constant current of 0.5 mA in a voltage range of 3.0–4.2 V. The condition of high-temperature storage was at 60° C. for 20 days under the charged condition of the second cycle. Table 2 shows mean values of capacities immediately before the storage, voltages and capacity maintenance rates immediately after the storage, and capacity maintenance rates at the second cycle after the storage.

TABLE 2

|  | Capacity immediately before storage (mAh) | Voltage immediately after storage (V) | Capacity maintenance rate immediately after storage (%) | Capacity maintenance rate at 2nd cycle after storage (%) |
|---|---|---|---|---|
| Battery B | 3.90 | 0.1 | 0 | 41 |
| Battery D2 | 3.91 | 3.9 | 53 | 91 |
| Battery E2 | 3.91 | 3.8 | 51 | 90 |
| Battery F2 | 3.90 | 3.9 | 53 | 91 |
| Battery G2 | 3.91 | 3.9 | 55 | 92 |
| Battery H2 | 3.91 | 3.9 | 55 | 92 |
| Battery I2 | 3.90 | 3.8 | 51 | 90 |
| Battery J2 | 3.91 | 3.9 | 55 | 92 |
| Battery K2 | 3.90 | 3.8 | 50 | 90 |

As clearly shown in Table 2, the batteries of Example 2 and the reference battery B had substantially equivalent capacities immediately before the storage. The battery B had a lowered voltage of 0.1 V immediately after the storage and the capacity maintenance rate of 0% immediately after the storage and 41% even at the second cycle after the storage. The batteries prepared in accordance with the present invention, on the other hand, had the voltage of not less than 3.8 V immediately after the storage, not less than 50% for the capacity maintenance rate immediately after the storage, and not less than 90% for the capacity maintenance rate at the second cycle after the storage. This clearly shows improvement in the high-temperature storage properties.

Then, properties of the batteries of the present invention and the reference battery B were evaluated after storage for three days at 85° C. under the charged condition of the second cycle in a similar manner to the above. Table 3 shows the results of this evaluation.

TABLE 3

|  | Capacity immediately before storage (mAh) | Voltage immediately after storage (V) | Capacity maintenance rate immediately after storage (%) | Capacity maintenance rate at 2nd cycle after storage (%) |
|---|---|---|---|---|
| Battery B | 3.90 | 0.07 | 0 | 22 |
| Battery D2 | 3.91 | 3.8 | 51 | 89 |
| Battery E2 | 3.91 | 3.7 | 49 | 82 |
| Battery F2 | 3.90 | 3.6 | 38 | 73 |
| Battery G2 | 3.91 | 3.8 | 51 | 89 |
| Battery H2 | 3.91 | 3.7 | 49 | 83 |
| Battery I2 | 3.90 | 3.7 | 33 | 69 |
| Battery J2 | 3.91 | 3.8 | 51 | 89 |
| Battery K2 | 3.90 | 3.6 | 31 | 65 |

As clearly seen in Table 3, the batteries D2, G2 and J2 of the present invention had the most excellent properties under more severe condition than the above, followed by the batteries E2 and He of the present invention.

Thus, it is understood that of the fluorocarbon elastomers, vinylidene fluoride-hexafluoropropylene copolymer, vinylidene fluoride-hexafluoropropylene-tetrafluoroethylene copolymer and tetrafluoroethylenepropylene copolymer are most preferable for a binder.

Cycle properties were also evaluated for newly prepared ten batteries each. Table 4 shows mean values of initial capacities and capacity maintenance rates at the 50th cycle for the respective batteries.

TABLE 4

|           | Initial capacity (mAh) | Capacity maintenance rate at 50th cycle (%) |
|-----------|------------------------|---------------------------------------------|
| Battery A | 3.92 | 82 |
| Battery B | 3.90 | 76 |
| Battery C | 2.87 | 81 |
| Battery D2 | 3.91 | 90 |
| Battery E2 | 3.91 | 90 |
| Battery F2 | 3.90 | 90 |
| Battery G2 | 3.91 | 91 |
| Battery H2 | 3.91 | 91 |
| Battery I2 | 3.90 | 90 |
| Battery J2 | 3.91 | 91 |
| Battery K2 | 3.90 | 90 |

Table 4 shows that the batteries of the present invention having fluorocarbon elastomers as a binder suffer from less capacity deterioration than the reference batteries and have improved cycle performance.

EXAMPLE 3

In this example, a positive electrode was prepared by utilizing $LiMn_2O_4$ as an active material and various fluorocarbon elastomers as a binder.

Elastomers of various vinylidene fluoride-containing copolymers were used as a binder. $LiMn_2O_4$ powder and acetylene black as a conductive agent were mixed in a weight ratio of 100:8, and added with a solution prepared by dissolving each copolymer in methyl isobutyl ketone to give a mixture of $LiMn_2O_4$ powder, the conductive agent, and the binder (solid content) at a weight ratio of 100:8:4. The mixture was sufficiently kneaded and was added with a cross-linking agent to prepare a paste. The paste-like mixture was applied onto a current collector of aluminum foil, which was heated at 150° C. and dried sufficiently. The current collector with the paste-like mixture applied thereon was pressed at a pressure of 2 ton/cm$^2$, and was cut into a 10 mm square piece as a positive electrode plate. The weight of the electrode mixture on the positive electrode plate was 20 mg.

Tetrahydrofuran was used as a solvent for the binder of an elastomer of tetrafluoroethylene-propylene copolymer and an elastomer of trifluoropropylmethylsiloxane polymer. Positive electrodes were manufactured in a similar manner to the above, using various binders and solvents.

Batteries were assembled with the positive electrodes thus obtained in the same manner as in Example 1. Battery D3 has vinylidene fluoride-hexafluoropropylene copolymer as a binder of the positive electrode, battery E3 has vinylidene fluoride-pentafluoropropylene copolymer, battery F3 has vinylidene fluoride-chlorotrifluoroethylene copolymer, battery G3 has vinylidene fluoride-hexafluoropropylene-tetrafluoroethylene copolymer, battery H3 has vinylidene fluoride-pentafluoropropylene-tetrafluoroethylene copolymer, battery I3 has vinylidene fluoride-perfluoromethyl vinyl ether-tetrafluoroethylene copolymer, battery J3 has tetrafluoroethylene-propylene copolymer, and battery K3 has trifluoropropylmethylsiloxane polymer.

A reference battery L was also prepared using a positive electrode having an aqueous dispersion of polytetrafluoroethylene as a binder.

Cycle properties were also evaluated for ten batteries each.

The charge and discharge was carried out at a constant current of 0.5 mA in a voltage range of 3.0–4.2 V. Table 5 shows mean values of initial capacities and capacity maintenance rates at the 50th cycle for the respective batteries.

TABLE 5

|           | Initial capacity (mAh) | Capacity maintenance rate at 50th cycle (%) |
|-----------|------------------------|---------------------------------------------|
| Battery D3 | 2.21 | 87 |
| Battery E3 | 2.21 | 86 |
| Battery F3 | 2.20 | 86 |
| Battery G3 | 2.21 | 87 |
| Battery H3 | 2.20 | 87 |
| Battery I3 | 2.20 | 86 |
| Battery J3 | 2.21 | 87 |
| Battery K3 | 2.20 | 86 |
| Battery L  | 2.20 | 71 |

Table 5 shows that the batteries of the present invention having fluorocarbon elastomers as a binder suffer from less capacity deterioration than the polytetrafluoroethylene-containing reference battery and have improved cycle performance.

EXAMPLE 4

In this example, a positive electrode was prepared by utilizing $LiCoO_2$ as an active material, and tetrafluoroethylene-hexafluoropropylene copolymer dispersed in an organic solvent and vinylidene fluoride-hexafluoropropylene copolymer (a fluorocarbon elastomer) dissolved in an organic solvent, as binders, respectively.

A positive electrode having tetrafluoroethylene-hexafluoropropylene copolymer was prepared in a similar manner to that in Example 1 while preparation of a positive electrode having vinylidene fluoride-hexafluoropropylene copolymer followed the process of Example 2. In Example 4, $LiCoO_2$ powders synthesized by combinations of three starting materials shown in Table 6 were used as a positive electrode active material. The heating temperature was 900° C. in all the cases.

TABLE 6

|                    | Co material | Mixing ratio of Co/Li | Li material |
|--------------------|-------------|-----------------------|-------------|
| Active material 1  | Guaranteed grade $Co_3O_4$ | 1.04 | Guaranteed grade $Li_2CO_3$ |
| Active material 2  | First grade $Co_3O_4$ | 1.04 | Guaranteed grade $Li_2CO_3$ |
| Active material 3  | Guaranteed grade $Co_3O_4$ | 1.00 | Guaranteed grade $Li_2CO_3$ |

A positive electrode having an aqueous dispersion of polytetrafluoroethylene as a binder was prepared as a reference.

Table 7 shows the incidence of application (i.e., coating) failure for fifty positive electrodes each.

TABLE 7

|  | Incidence of application (coating) failure (%) | | |
| --- | --- | --- | --- |
|  | Active material 1 | Active material 2 | Active material 3 |
| Tetrafluoroethylenehexa-fluoropropylene copolymer | 0 | 1 | 2 |
| Vinylidene fluoridehexa-fluoropropylene copolymer | 0 | 2 | 2 |
| Polytetrafluoroethylene (aqueous dispersion) | 1 | 48 | 98 |

When tetrafluoroethylene-hexafluoropropylene copolymer or vinylidene fluoride-hexafluoropropylene copolymer was used as a binder, the incidence of application failure was not greater than 2% for any of the positive electrode active materials 1, 2, and 3. The incidence of application failure of the reference electrode was 2% for the active material 1 but undesirably high as 48% and 98% for the active materials 2 and 3, respectively.

Table 8 shows initial capacities and capacity maintenance rates at the 50th cycle for batteries prepared in the same manner as in Example 1 having the binders and positive electrode active materials specified above.

The charge and discharge was carried out at a constant current of 0.5 mA in a voltage range of 3.0–4.1 V.

TABLE 8

|  | Initial capacity (mAh)/Capacity maintenance rate at 50th cycle (%) | | |
| --- | --- | --- | --- |
|  | Active material 1 | Active material 2 | Active material 3 |
| Tetrafluoroethylenehexa-fluoropropylene copolymer | 2.36 98 | 2.35 98 | 2.34 98 |
| Vinylidene fluoridehexa-fluoropropylene copolymer | 2.36 99 | 2.34 99 | 2.34 99 |
| Polytetrafluoroethylene (aqueous dispersion) | 2.34 96 | 2.21 87 | 1.99 51 |

As shown in Table 8, any binders gave equivalent properties for those having the low incidence of application failure and poorer properties for those having the high incidence of application failure. The vinylidene fluoride-hexafluoropropylene copolymer used as a binder had the highest capacity maintenance rate at the 50th cycle and improved cycle performance.

When $LiCoO_2$ was used as a positive electrode active material, preparation in a non-aqueous system gave stable positive electrodes having excellent properties without effects of remaining lithium salts. This process also effectively lowers the ratio of application failure irrespective of the purity of $LiCoO_2$ applied. This reduces the time and labor required for troublesome quality maintenance of materials significantly affecting the purity of $LiCoO_2$.

Substantial elimination of effects of the remaining lithium salts is also observed in other lithium-containing oxides such as $LiNiO_2$, $LiMnO_2$, and $LiMn_2O_4$ used as a positive electrode active material, as well as $LiCoO_2$.

Although vinylidene fluoride-hexafluoropropylene copolymer was used as the fluorocarbon elastomer in the above-mentioned Example, pastes in an organic solvent of vinylidene fluoride-pentafluoropropylene copolymer, vinylidene fluoride-chlorotrifluoroethylene copolymer, vinylidene fluoride-hexafluoropropylene-tetrafluoroethylene copolymer, vinylidene fluoride-pentafluoropropylene-tetrafluoroethylene copolymer, vinylidene fluoride-perfluoromethyl vinyl ether-tetrafluoroethylene copolymer, tetrafluoroethylene-propylene copolymer, and trifluoropropylmethylsiloxane polymer have the equivalent effects.

The fluorocarbon elastomers used in Examples 2, 3, and 4 may be cross-linked with a cross-linking agent such as polyamines, polyols, and peroxides.

Although carbon was used for a negative electrode active material in the above-mentioned Examples, any materials which allow reversible storage and discharge of lithium, such as lithium-alloyed metals represented by metal aluminum and aluminum alloy, graphite-like compounds, metal lithium or lithium alloy, may be applied instead.

In the above-mentioned embodiments, $LiNiO_2$, $LiCoO_2$, $LiMnO_2$, and $LiMn_2O_4$ were used for a positive electrode active material; the transition elements of these compounds, however, may be substituted by B, Mg, Ca, Sr, Ba, Ti, V, Cr, Mn, Fe, Co, Ni, Cu, Al, In, Nb, Mo, W, Y, or Rh. The compounds containing transition metals partly substituted with these elements have effects of the present invention described above, though less effects in many cases.

The present invention is applicable to positive electrodes containing, as an active material, compounds represented by the general formula $Li_x(Mn_{1-y}M_y)_2O_4$, wherein M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.10$, and $0 \leq y \leq 0.5$.

In the above-mentioned Embodiments, lithium hexafluorophosphate was used as a lithium salt and ethylene carbonate and diethyl carbonate were used as the solvents of the electrolyte. Examples of possible lithium salt other than lithium hexafluorophosphate include lithium perchlorate, lithium tetrafluoroborate, and lithium trifluoromethane sulfonate. Examples of non-protonic solvents applicable to lithium secondary batteries other than ethylene carbonate and diethyl carbonate include propylene carbonate, dimethoxyethane, γ-butyrolactone, dioxolane, tetrahydrofuran, methyltetrahydrofuran, and dimethyl sulfoxide.

It is not preferable, however, to use tetrahydrofuran or methyltetrahydrofuran as the non-aqueous electrolyte for the binder of tetrafluoroethylene-hexafluoropropylene copolymer.

Organic solvents used for preparation of the paste-like active material were a mixture of xylene and cyclohexane in Example 1 and methyl isobutyl ketone and tetrahydrofuran in Example 2. Other organic solvents including toluene, methyl acetate, butyl acetate, methyl ethyl ketone, methyltetrahydrofuran, and dimethylformamide may be applied independently or as a mixture for preparation of an active material paste.

In the above-mentioned Examples, the positive electrode active material, the conductive agent, and the binder were mixed in the weight ratio of 100:3:4. The preferable contents of the positive electrode active material and the binder are not less than 70% and in a range of from 0.5 to 10% by weight, respectively. The smaller content of positive electrode active material undesirably lowers the capacity of the positive electrode per unit weight or volume. The greater amount of the binder prevents smooth current collection to lower the capacity, while the smaller amount reduces the strength of the electrode to deteriorate the properties.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above-mentioned disclosure. Accordingly, it is intended that the appended claims be interpreted as covering all alterations and modifications as fall within the true spirit and scope of the invention.

What is claimed is:

1. A positive electrode for a non-aqueous electrolyte lithium secondary battery, which comprises a positive electrode active material represented by the general formula $Li_xA_{1-y}M_yO_2$ wherein A represents at least one transition element selected from the group consisting of Mn, Co, and Ni, M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$; a binder; a conductive agent; and a current collector, wherein said binder is at least one member selected from the group consisting of a copolymer comprising a vinylidene fluoride unit, a copolymer comprising a propylene unit and a tetrafluoroethylene unit, and a polymer comprising a trifluoropropylmethylsiloxane unit.

2. A positive electrode in accordance with claim 1, wherein said copolymer comprising a vinylidene fluoride unit is an elastomer selected from the group consisting of:

a copolymer comprising a vinylidene fluoride unit and a hexafluoropropylene unit, a copolymer comprising a vinylidene fluoride unit and a pentafluoropropylene unit, a copolymer comprising a vinylidene fluoride unit and a chlorotrifluoroethylene unit, a copolymer comprising a vinylidene fluoride unit, a hexafluoropropylene unit and a tetrafluoroethylene unit, a copolymer comprising a vinylidene fluoride unit, a pentafluoropropylene unit and a tetrafluoroethylene unit, and a copolymer comprising a vinylidene fluoride unit, a perfluoromethyl vinyl ether unit and a tetrafluoroethylene unit.

3. A positive electrode in accordance with claim 2, wherein said copolymer comprising the vinylidene fluoride unit and the hexafluoropropylene unit is vinylidene fluoride-hexafluoropropylene copolymer having 50–85 mol % of the vinylidene fluoride unit.

4. A positive electrode in accordance with claim 2, wherein said copolymer comprising the vinylidene fluoride unit and the pentafluoropropylene unit is vinylidene fluoride-pentafluoropropylene copolymer having 50–85 mol % of the vinylidene fluoride unit.

5. A positive electrode in accordance with claim 2, wherein said copolymer comprising the vinylidene fluoride unit and the chlorotrifluoroethylene unit is vinylidene fluoride-chlorotrifluoroethylene copolymer having 50–75 mol % of the vinylidene fluoride unit.

6. A positive electrode in accordance with claim 2, wherein said copolymer comprising the vinylidene fluoride unit, hexafluoropropylene unit, and tetrafluoroethylene unit is vinylidene fluoride-hexafluoropropylene-tetrafluoroethylene copolymer having 20–50 mol % of the vinylidene fluoride unit and not greater than 30 mol % of the tetrafluoroethylene unit.

7. A positive electrode in accordance with claim 2, wherein said copolymer comprising the vinylidene fluoride unit, pentafluoropropylene unit, and tetrafluoroethylene unit is vinylidene fluoride-pentafluoropropylene-tetrafluoroethylene copolymer having 20–50 mol % of the vinylidene fluoride unit and not greater than 30 mol % of the tetrafluoroethylene unit.

8. A positive electrode in accordance with claim 2, wherein said copolymer comprising the vinylidene fluoride unit, perfluoromethyl vinyl ether unit, and tetrafluoroethylene unit is vinylidene fluoride-perfluoromethyl vinyl ether-tetrafluoroethylene copolymer having 10–50 mol % of the vinylidene fluoride unit and not greater than 35 mol % of the tetrafluoroethylene unit.

9. A positive electrode in accordance with claim 1, wherein said copolymer comprising the propylene unit and tetrafluoroethylene unit is propylene-tetrafluroethylene copolymer having 30–60 mol % of the tetrafluorethlene unit.

10. A method of manufacturing a positive electrode for a non-aqueous electrolyte lithium secondary battery, which comprises the steps of:

mixing a positive electrode active material represented by the general formula $Li_xA_{1-y}M_yO_2$ wherein A represents at least one transition element selected from the group consisting of Mn, Co, and Ni, M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$; a binder; a conductive agent; and an organic solvent to prepare a paste-like electrode mixture, wherein said binder is selected from the group consisting of a copolymer comprising a vinylidene fluoride unit, a copolymer comprising a propylene unit and a tetrafluoroethylene unit, and a polymer comprising a trifluoropropylmethylsiloxane unit; and applying said paste-like electrode mixture onto a current collector and drying.

11. A method of manufacturing a positive electrode for a non-aqueous electrolyte lithium secondary battery, which comprises the steps of:

mixing a positive electrode active material represented by the general formula $Li_xA_{1-y}M_yO_2$ wherein A represents at least one transition element selected from the group consisting of Mn, Co, and Ni, M represents at least one element selected from the group consisting of B, Mg, Ca, Sr, Ba, Ti, V, Cr, Mn, Fe, Co, Ni, Cu, Al, In, Nb, Mo, W, Y, and Rh, and wherein $0.05 \leq x \leq 1.1$, and $0 \leq y \leq 0.5$; a binder; a conductive agent; and an organic solvent for dissolving said binder to prepare a paste-like electrode mixture, wherein said binder is selected from the group consisting of a copolymer comprising a vinylidene fluoride unit, a copolymer comprising a propylene unit and a tetrafluoroethylene unit, and a polymer comprising a trifluoropropylmethylsiloxane unit; and applying said paste-like electrode mixture onto a current collector and drying.

12. A positive electrode for a non-aqueous electrolyte lithium secondary battery wherein the electrode is manufactured according to the method of claim 10.

13. A positive electrode for a non-aqueous electrolyte lithium secondary battery wherein the electrode is manufactured according to the method of claim 11.

* * * * *